United States Patent [19]
Moss

[11] 3,815,328
[45] June 11, 1974

[54] EMISSION CONTROL MUFFLER MEANS AND METHOD

[76] Inventor: William A. Moss, P.O. Box 2552, Lafayette, La. 70501

[22] Filed: July 3, 1972

[21] Appl. No.: 268,683

[52] U.S. Cl.............................. 55/93, 55/95, 55/244
[51] Int. Cl............................................. B01d 47/02
[58] Field of Search............ 55/DIG. 30, 84, 85, 89, 55/93, 94, 95, 220, 244, 248, 257; 261/22, 30, 77

[56] References Cited
UNITED STATES PATENTS

| | | | |
|---|---|---|---|
| 1,187,208 | 6/1916 | Waht | 55/244 |
| 3,340,859 | 9/1967 | Williamson | 55/DIG. 30 |
| 3,372,540 | 3/1968 | Birdwell | 261/77 |
| 3,476,524 | 11/1969 | Burke | 55/DIG. 30 |

FOREIGN PATENTS OR APPLICATIONS

| 1,034,147 | 7/1958 | Germany | 58/89 |
|---|---|---|---|

Primary Examiner—Charles N. Hart
Attorney, Agent, or Firm—Wolf, Greenfield & Sacks

[57] ABSTRACT

A plural compartment enclosing housing carries a baffle and filtering media in liquid form in each compartment. Combustion exhaust gases are passed to a first compartment through said liquid and subsequently to said second compartment. Baffling and filtering occurs in the liquids of each compartment. Means then permit filtered exhaust gas to be exhausted from the second compartment with a portion thereof along with entrained liquid passing through a flowback device to the first compartment. A stationary liquid reservoir is established in each compartment. Pollutants are rapidly and efficiently removed from the combustion exhaust gas making the device highly useful in automobile and truck applications in place of conventional mufflers.

9 Claims, 4 Drawing Figures

PATENTED JUN 11 1974 3,815,328

EMISSION CONTROL MUFFLER MEANS AND METHOD

BACKGROUND OF THE INVENTION

The problem of emission control and pollutants to the air from internal combustion engines arising from truck and automobile sources are well-known. Various hydrocarbons as well as carbon monoxide and other gases frequently cause widespread pollution about major traffic arteries.

Efforts have been made to curtail the polluting effects of exhaust gases. In some cases, the art in prior years turned to using flowing liquid muffler-type devices in various arrangements to act on automobile exhausts. However, as far as is known, such developments have not met with commercial success on an extensive scale probably due to the inadequate remedies thereby provided.

SUMMARY OF THE INVENTION

It is an important object of this invention to provide a means and method for controlling harmful exhaust gas emissions from internal combustion engines.

Still another object of this invention is to provide a liquid baffle and filtering emission control muffler device which can be easily manufactured and used for a wide variety of commercial applications.

According to the invention an emission control muffler device has an enclosing housing with a plurality of compartments. one of the compartments is an exhaust gas receiving compartment for receiving exhaust gas from an internal combustion engine such as an automobile engine. A second one of the compartments is an exhaust outlet compartment. The compartments define means for carrying a liquid in each compartment. Exhaust means for passing an exhaust gas into the first compartment below the level of a liquid in said means for carrying a liquid is located in the first compartment. The first compartment also carries a means for collecting the exhaust gas in the first compartment after the gas has passed through the liquid and for passing the gas to a second compartment below the level of a liquid in the second compartment means for carrying the liquid.

The second compartment also contains a filter for retrieving the exhaust gas after passage through the liquid in the second compartment and passing the so filtered gas out of the device. A flowback device collects some exhaust gas along with entrained liquid from the top of the second compartment and recycles the liquid back to the first compartment, thus allowing for a fixed liquid supply to be established in the compartments without the need for additional fluid flow during use.

According to the method of this invention, an exhaust gas is passed through a first stationary liquid reservoir, retrieved after being filtered by the liquid, above the level of the liquid and then passed through a second stationary liquid reservoir. The exhaust gas is again filtered in the secondary reservoir and is retrieved above the level of the reservoir passing out to the atmosphere. However, a portion of the gas along with entrained liquid is carried back to the first compartment to maintain a substantially constant level of liquid reservoir in the first and second compartments during use.

It is a feature of this invention that small size compartments can be used without the need for flowing supplementary liquid to the compartments. Yet, the liquid which may be water, acts to substantially remove pollutants over long periods of use while simultaneously acting to muffle noise.

BRIEF DESCRIPTION OF THE DRAWINGS

The above and other objects, features and advantages of the present invention will be better understood from the following specification when read in conjunction with the accompanying drawings in which.

DESCRIPTION OF PREFERRED EMBODIMENTS

Figure 1:
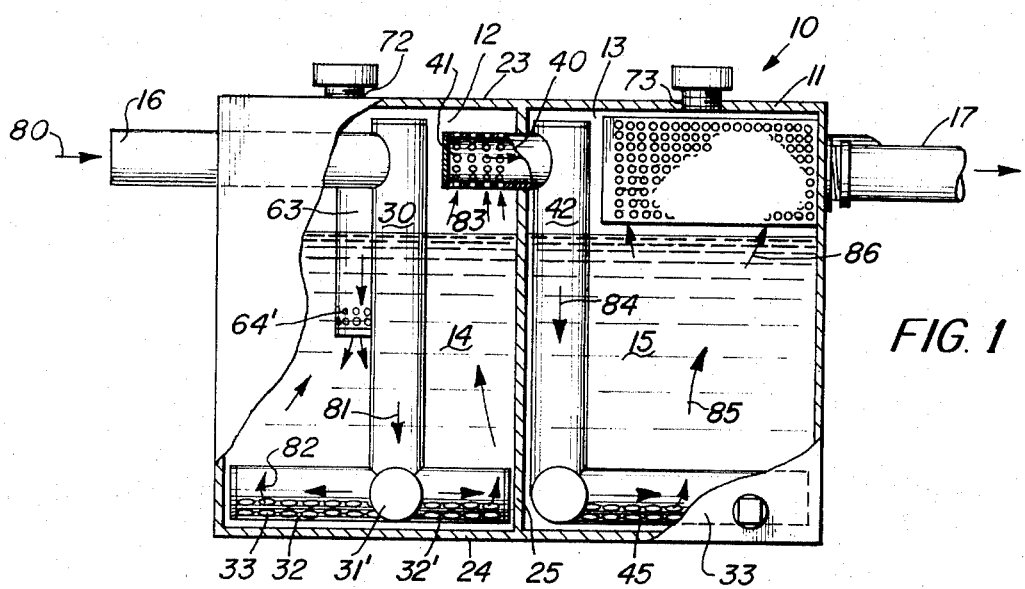
FIG. 1 is a side view of a preferred embodiment of an emission control muffler device of this invention with a portion of the casing removed.
Figure 2:
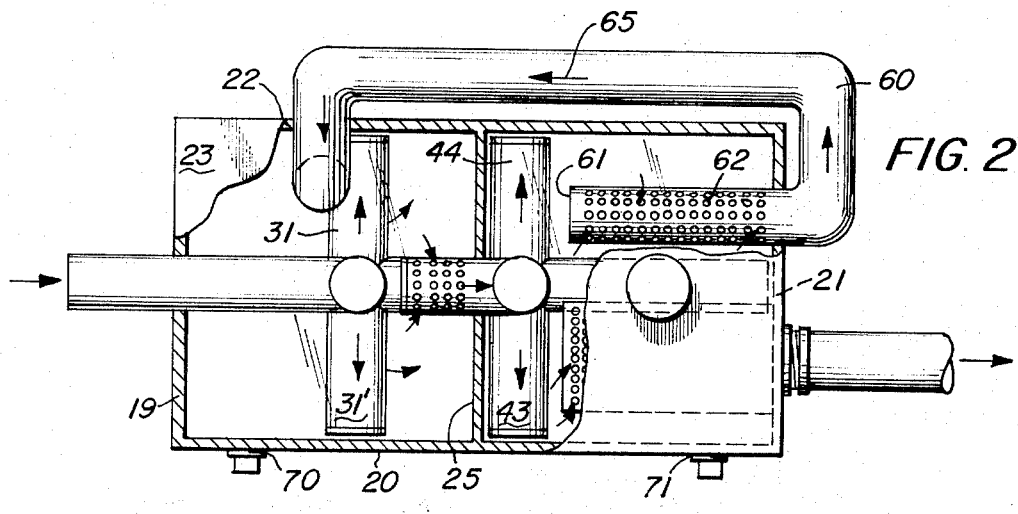
FIG. 2 is a top view thereof with portions of the casing broken away.
Figures 3, 4:
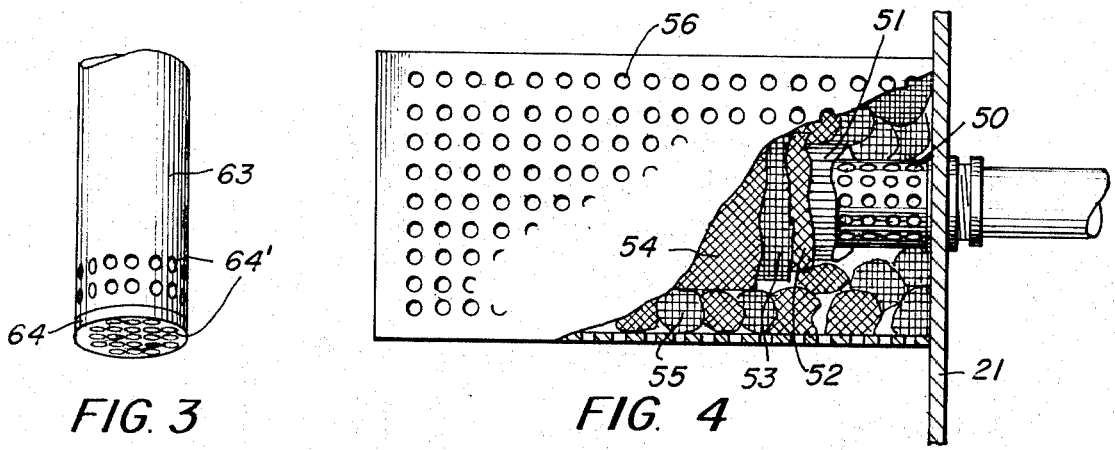
FIG. 3 is a fragmentary side view of an element thereof.
FIG. 4 is a top plan view of an element thereof with portions broken away to show the internal construction.

With reference now to the drawings and more particularly FIGS. 1 and 2, a preferred embodiment of an emission control muffler device is illustrated generally at 10 and has a casing or housing 11 divided into an exhaust gas receiving compartment 12 and an exhaust outlet gas compartment 13 with each compartment carrying a liquid reservoir 14 and 15 respectively with conduits 16 and 17 acting respectively as an engine exhaust gas receiving passageway and an engine exhaust outlet passageway.

The casing 11 is of generally rectangular outer configuration and formed by side walls 19, 20, 21 and 22 with top walls 23 and bottom wall 24 all integrally joined together in liquid tight relationship. A partition or separator wall 25 divides the casing into two preferably equal sized compartments which are sealed from each other except through conduits as will be described. In the preferred embodiment, each compartment has a size of 16 inches in height × 10 inches in width × 10 inches in length.

Passing through wall 19 is the exhaust gas receiving pipe 16 which is joined to a downwardly extending pipe 30 which is in turn joined to spreader pipes 31, 31' and 32, 32'. The spreader pipes preferably lie substantially at the bottom wall 24 or are spaced slightly thereabove by conventional spacers not shown and are provided with gas passage apertures 33 about the lower half of their circumference. In the preferred embodiment, the pipes 16, 30, 31, 31', 32 and 32' have an inside diameter of 2 ¼ inches and holes 33 have a diameter of one-fourth inch.

A substantially similar conduit arrangement is provided in compartment 13 by pipe 40 which passes through partition wall 25 and has suitable gas apertures 41. Pipe 40 is connected with a downwardly depending pipe 42 which joins T-shaped pipe sections 43, 44 and 45. The T-shaped pipes are provided with apertures 33 as described in connection with pipes 31, 31', 32 and 32' in compartment 12. Preferably ends of the T-shaped pipe are closed to provide all gas flow through the apertures 33 as is the case with pipes 31, 31', 32 and 32'.

The exhaust gas outlet pipe 17 is preferably screw threaded to the side wall 21 by conventional means with a portion thereof passing through wall 21 and provided with inch diameter gas receiving apertures 50. The perforated portion of the pipe 17 is preferably surrounded with a filtering, perforated shield means to reduce velocity of exhaust and liquids from the secondary tank. The shield means comprises a metal lath 51 having inch uniform perforations with surrounding copper screening layers 52, 53, 54 having uniformly spaced 1/16 inch openings and rolled copper screen forms 55 having uniformly spaced inch openings with a cylindrical outer casing 56 having a plurality of inch perforations. The whole shield means can be suitably threaded to the perforated portion of pipe 50 to allow for removal and cleaning. In some cases, the pipe 50 ends at the wall 21 and perforated portion 50 is a separate pipe axially aligned with pipe 17 and screw threaded to wall 21 forming a part of the shield means. The size of the mesh and perforations used are designed to allow passage of exhaust gas while retaining or preventing substantial flow of liquid or water vapor through the filtering unit to the exhaust pipe 17.

A backflow conduit 60 is formed of pipe having an open end 61 and a perforated inlet portion 62 as for example having inch perforations throughout its circumference. The flowback pipe 60 passes out of wall 21 and rearwardly into wall 22 with a downwardly extending leg 63 opening into the first or primary compartment through a baffle bottom plate 64 and a plurality of 3/32 inch perforations 64 which allow water vapor to egress into the liquid reservoir 14 but substantially prevents flow of exhaust gases in a direction reverse to arrows 65. The perforations 64 are spaced below the liquid level in compartment 12.

The liquid reservoirs 14 and 15 are established by filling with a muffling and filtering liquid which is water in the preferred embodiment although other liquids may be used. The stationary reservoirs are established by closing drain ports 70 and 71 through the use of suitable stop-screw-type caps. Top fill ports 72 and 73 can be provided with pressure caps to maintain the pressure within the tank below that which would cause an explosive hazard should the exhaust pipe 17 become clogged.

The level of each of the fluid reservoirs 14 and 15 is preferably maintained as shown in FIG. 1 with the baffle 64 positioned below the level of the reservoir 14 and with the end of pipe 40, the casing 56 and the inlet end 62 positioned above the level of the liquid reservoirs. Preferably the liquid level is established at 8 inches below the top wall 23.

In use, the device 10 can be used to muffle and filter exhaust gas from internal combustion engines. For example, the exhaust inlet 16 can be hooked to the exhaust manifold of an automobile engine through any conventional conduit means with the exhaust outlet 17 forming a conventional tailpipe or connected thereto by conventional means. The stationary water reservoirs 14 and 15 are established and the drain and fill ports closed. The automobile engine is then run with the gases passing in the direction of arrows 80, 81, 82, 83, 84, 85, 86 and 65.

The exhaust gas thus goes through pipe 16 and is discharged by pipes 31, 31, 32, 32 into the bottom of water reservoir 14 passing upwardly to the perforations 41 through pipe 42 and out of perforations 33 of pipes 43, 44, 45 upwardly therefrom with a substantial portion of the now filtered exhaust gas passing out through exhaust pipe 17 and a smaller portion of the exhaust gas along with entrained water vapor passing through the flowback device and into the liquid reservoir 14 through the end 64.

In a series of tests, the above-described muffler was shown to significantly reduce carbon monoxide in exhaust systems of automobiles. Using a 1968 440 cu.in. Chrysler New Yorker engine, the following test results were obtained by testing the exhaust gas issuing from pipe 17 with pipe 16 connected to the exhaust manifold of the engine:

| Test results | at idle rpm | at 2000 rpm |
|---|---|---|
| Hydrocarbons | 275 ppm | 75 ppm |
| Carbon Monoxide | 1.5% | 0.075% and lower |

These results were obtained on a Sun Electric Corporation (Metairie, LA) Sun infra-red exhaust emission tester 910. Simultaneously the noise level of the muffler operation was substantially equivalent to the noise level customarily encountered with conventional exhaust mufflers of the non-liquid type.

While a specific example of the present invention has been shown and described, it should be understood that many variations are possible. For example, the dimensions and configuration of the emission control muffler device of this invention or parts thereof can vary substantially depending upon its particular usage. While rectangular configuration casings are preferred, other shapes can be used. Preferably all parts of the device are formed of metal for providing high mechanical strength and resistance to thermal deterioration; however, other high temperature resistant materials can be used. The particular filters used can vary greatly as can the positioning of the flowback device. The pipe positions and configurations can vary, so long as the exhaust gas is discharged in each compartment so as to allow filtering by the liquid contained therein. In all cases, it is preferred that a flowback pipe be used between the first and second compartment to enable entrapment and return of the liquid thereby preventing loss of the liquid going from the first to second compartment. By the use of the flow back pipe, liquid levels can be maintained over long time periods without the need for the use of constant addition of liquids.

While a two-compartment muffler has been described, in some cases, three or more seriatim arranged compartments can be used, while maintaining the principles of this invention.

What is claimed is:
1. An emission control muffler device comprising,
an enclosing housing defining a plurality of compartments,
a first one of said plurality of compartments comprising an exhaust gas receiving compartment and a second one of said compartments comprising an exhaust outlet compartment,
said first and second compartments each defining independent means for carrying a liquid,
exhaust means for passsing an exhaust gas into said first compartment below the level of a liquid in said means for carrying the liquid,
means for collecting said exhaust gas in said first compartment after said gas has passed through said liquid and for passing said gas to said second compartment below the level of a liquid in said second compartment means for carrying the liquid,
means for passing exhaust gas out of said second compartment and flowback means for passing a portion of said exhaust gas back to said first compartment from said second compartment along with entrapped liquid carried thereby.

2. An emission control muffler device in accordance with claim 1 wherein said means for collecting said exhaust gas in said first compartment, said means for passing said exhaust gas out of said second compartment and said flowback means define inlets spaced above the level of said liquid in said compartments.

3. An emission control muffler device in accordance with claim 2 wherein said exhaust means for passing an exhaust gas into said first compartment comprises a plurality of pipes with at least one of said pipes defining a plurality of perforations through which said exhaust gas passes into said liquid.

4. An emission control muffler device in accordance with claim 3 wherein said means for collecting said exhaust gas in said first compartment and for passing said gas to said second compartment comprises a second plurality of pipes, said second plurality of pipes comprising at least one pipe having a plurality of perforations therein for passing said gas to said liquid in said second compartment.

5. An emission control muffler device in accordance with claim 4 wherein said flowback means comprises a flowback pipe having an opening positioned in said first compartment below the level of said liquid in said compartment.

6. An emission control muffler device for use in removing contaminants from and muffling noise of an internal combustion engine, said device comprising
first and second separate liquid reservoirs,
means for passing exhaust gas from an engine through said first and second liquid reservoirs,
pipe means for maintaining said first liquid reservoir at a predetermined level without addition of supplementary liquid by passing a portion of said exhaust gas along with entrapped liquid from said second reservoir to said first reservoir,
and means for collecting and passing said gas to the atmosphere.

7. An emission control muffler device in accordance with claim 1 wherein said flowback means comprises a flowback pipe having an opening positioned in said first compartment below the level of said liquid in said compartment.

8. A method of muffling and filtering an exhaust gas from an internal combustion engine, said method comprising,
passing said gas through a first stationary liquid reservoir, retrieving said gas from said liquid reservoir and passing it through a second stationary liquid reservoir,
retrieving said gas from said second stationary liquid reservoir and discharging a portion of it to the atmosphere while a portion of said gas retrieved from said secondary stationary liquid reservoir is passed back to said first stationary liquid reservoir along with entrapped liquids carried over from said second stationary liquid reservoir.

9. A method of muffling and filtering an exhaust gas from an internal combustion engine in acordance with the method of claim 8 wherein said liquid is water.

* * * * *

UNITED STATES PATENT OFFICE
CERTIFICATE OF CORRECTION

Patent No. 3,815,328      Dated June 11, 1974

Inventor(s) William A. Moss

It is certified that error appears in the above-identified patent and that said Letters Patent are hereby corrected as shown below:

Column 1; line 30, change "one" to --One--
Column 3; line 1, after "with" add --1/4--
           line 6, after "ing" add --1/4--
           line 9, after "spaced" add --1/8--
           line 10, after "of" add --1/4--
           line 23, after "having" add --1/4--
           line 28, change "64" to --64'--
           line 31, change "64" to --64'--
           line 62, change "31" (second occurrence) to --31'--
           line 62, change "32" (second occurrence) to --32'--
Column 4; line 41, change "flow back" to --flowback--

Signed and sealed this 1st day of October 1974.

(SEAL)
Attest:

McCOY M. GIBSON JR.            C. MARSHALL DANN
Attesting Officer              Commissioner of Patents